United States Patent

[11] 3,585,497

| [72] | Inventor | Eugene W. Dalzell, Jr.<br>Pittsfield, Mass. |
|---|---|---|
| [21] | Appl. No. | 814,131 |
| [22] | Filed | Apr. 7, 1969 |
| [45] | Patented | June 15, 1971 |
| [73] | Assignee | The United States of America as represented by the Secretary of the Army |

[54] BULLET HOLE LOCATOR-OPEN CIRCUIT TYPE
1 Claim, 3 Drawing Figs.

[52] U.S. Cl................................................. 324/65R,
273/102.2 A
[51] Int. Cl........................................................ G01r 27/02,
A63b 63/00
[50] Field of Search............................................ 324/65;
73/167; 273/102.2; 235/151.3; 340/16

[56] References Cited
UNITED STATES PATENTS
| 2,925,582 | 2/1960 | Mattei et al.................. | 340/16 |
| 3,445,808 | 5/1969 | Johnson........................ | 340/16 |
| 3,489,413 | 1/1970 | Groder et al.................. | 340/16 X |

FOREIGN PATENTS
| 496,874 | 4/1930 | Germany...................... | 273/102.2 |
| 707,283 | 5/1941 | Germany...................... | 273/102.2 |

*Primary Examiner*—Rudolph V. Rolinec
*Assistant Examiner*—Ernest F. Karlsen
*Attorneys*—Harry M. Saragovitz, Edward J. Kelly, Herbert Berl and Robert P. Gibson

ABSTRACT: The direction from which a bullet or other object came is ascertained by comparing the points at which the object passed spaced-apart planes. Spaced electrically conducting wires or strips are crisscrossed to form a grid. A passing object smashes through the grid of pairs of electrical wires or strips in a first plane. It forces one wire or strip of a first pair into contact with a second wire or strip to close an electrical circuit. The object also closes a circuit through a second pair of wires or strips, in the first plane, running at right angles to the first pair, to close a second electrical circuit. An indicator or computer senses the point at which the object passed through these two pairs of wires or strips in the first plane. A similar grid is placed in a second plane, substantially parallel with said first plane. The second grid is also pierced by the passing object. The indicator or computer senses the point at which the object passed the second plane. It compares the two points and determines the direction from which the object came.

PATENTED JUN 15 1971
3,585,497
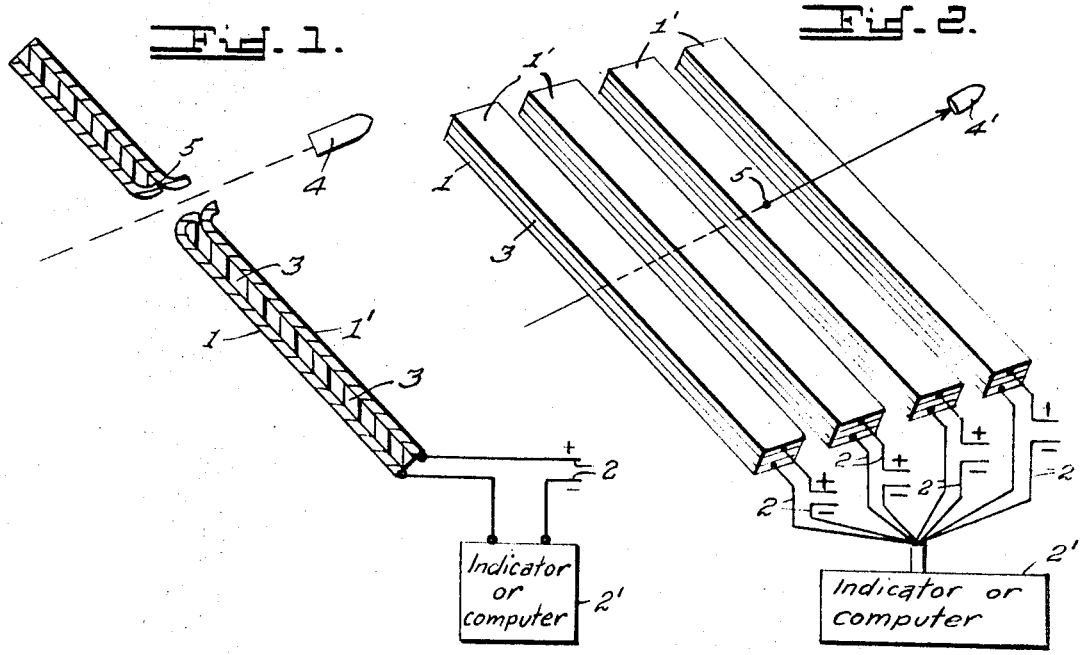
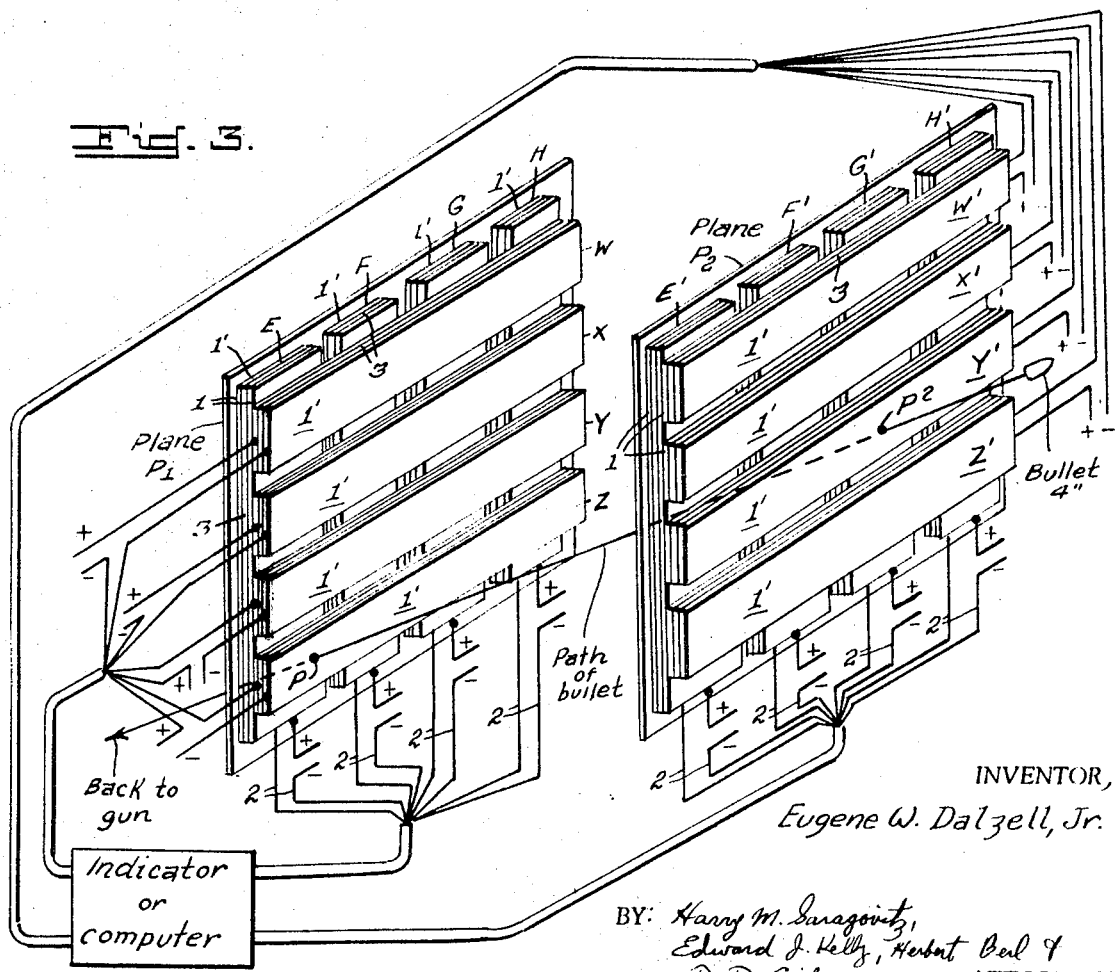
INVENTOR,
Eugene W. Dalzell, Jr.
BY: Harry M. Saragovitz,
Edward J. Kelly, Herbert Berl &
R. P. Gibson    ATTORNEYS.

BULLET HOLE LOCATOR-OPEN CIRCUIT TYPE

In patent application, Ser. No. 719,137, filed Apr. 5, 1968, now U.S. Pat. 3,445,808 F. P. Johnson discloses apparatus for determining the direction of a bullet as it passes through two spaced-apart sheets of material. A system of microphones (eight, for example) and a computer are used.

In the present invention an arrangement of spaced sheets of crisscrossed strips of flat material or wire mesh, or wires, or such, serves the sensing function as will be explained in further detail hereinafter.

In the Drawings:

FIG. 1 illustrates a basic component;

FIG. 2 illustrates one form of the system.

FIG. 3 illustrates a sophisticated system.

In FIG. 1 a current from conductors 2 is applied to conducting wires or strips of metal, mesh, or such, 1 and 1'. An insulator 3 may be used if desired. The circuit is open and no current flows.

A bullet or other object 4 smashes conductor 1 into contact with conductor 1' at area 5. The circuit is closed and indicator or computer 2' reacts to indicate that wire or strip 1 has been hit.

If desired a plurality of conductors 1, 1', parallel with each other, may be located in side-by-side relationship in a plane, as in FIG. 2. Then, if the passing object 4' should miss a single pair of conductors as illustrated in FIG. 1 it will strike a pair farther from or closer to the observer, as indicated in FIG. 2.

FIG. 3 illustrates a more sophisticated version of the invention, capable of ascertaining the direction of a bullet or object 4". Wires or strips 1, 1' are arranged in a grid, crisscrossed pattern, in two planes $P_1$ and $P_2$, preferably substantially parallel with each other to minimize mathematical or computer computations. Bullet 4" strikes at P, closing the circuits across strips E and Z, and at $P^2$, closing the circuits across strips G' and Y'. The indicator or computer reacts to indicate the locations of holes P, $P^2$. From this data or indication an automatic computer, or a mathematician, may readily compute the path of the bullet or other object.

Other modifications will suggest themselves to those skilled in the art.

I claim:

1. Apparatus for determining movement characteristics of a passing object comprising a first crisscrossed grid pattern of spaced-apart sensing devices, a second crisscross grid pattern of spaced-apart sensing devices substantially parallel with said first grid but spaced therefrom, each sensing device comprising pairs of substantially parallel mesh conductors one another but not in electrical contact and adapted to be distorted into electrical contact with one another by the passing object, and indicator means electrically connected to said first and said second grids of mesh conductors to indicate the point where a passing object penetrated each grid whereby a comparison of the points indicates the direction of travel of the passing object.